(12) United States Patent
Lewis et al.

(10) Patent No.: US 10,525,901 B2
(45) Date of Patent: Jan. 7, 2020

(54) AUTOMATED VEHICLE PROTECTED AND AERODYNAMICALLY LOCATED SENSORS

(71) Applicant: Aptiv Technologies Limited, St. Michael (BB)

(72) Inventors: Matthew J. Lewis, Mountain View, CA (US); John P. Absmeier, Capitola, CA (US); Michael H. Laur, Mission Viejo, CA (US)

(73) Assignee: Aptiv Technologies Limited (BB)

( * ) Notice: Subject to any disclaimer, the term of this patent is extended or adjusted under 35 U.S.C. 154(b) by 256 days.

(21) Appl. No.: 15/549,025

(22) PCT Filed: Jan. 26, 2016

(86) PCT No.: PCT/US2016/014797
§ 371 (c)(1),
(2) Date: Aug. 4, 2017

(87) PCT Pub. No.: WO2016/126452
PCT Pub. Date: Aug. 11, 2016

(65) Prior Publication Data
US 2018/0031696 A1    Feb. 1, 2018

Related U.S. Application Data

(60) Provisional application No. 62/112,783, filed on Feb. 6, 2015.

(51) Int. Cl.
*B60R 11/04* (2006.01)
*B60K 31/00* (2006.01)
(Continued)

(52) U.S. Cl.
CPC .......... *B60R 11/04* (2013.01); *B60K 31/0008* (2013.01); *G01S 13/867* (2013.01);
(Continued)

(58) Field of Classification Search
CPC ...................................................... B60R 11/04
(Continued)

(56) References Cited

U.S. PATENT DOCUMENTS

| 8,480,142 B2 | 7/2013 | Wuerfel |
| 2012/0039084 A1* | 2/2012 | Eckhardt ............... G02B 5/124 362/516 |

(Continued)

FOREIGN PATENT DOCUMENTS

| EP | 3078987 A1 * | 10/2016 | ............ B60R 11/04 |
| JP | 07-190732 A | 7/1995 | |

(Continued)

*Primary Examiner* — Jason S Morrow
(74) *Attorney, Agent, or Firm* — Joseph V. Bonadies

(57) ABSTRACT

A sensor mounting arrangement suitable for an autonomous or automated vehicle having an aerodynamic generally rounded or curved front perimeter surface symmetrically arranged relative to a longitudinal axis of the vehicle. The sensor is mounted so as to be tipped toward a more optimal sensing direction, bringing a leading portion outboard of, and a trailing portion inboard of, the ideal front perimeter surface, but putting the sensor in a more optimal sensing orientation. A transparent cover protects the sensor and blends aerodynamically into the front perimeter body surface.

4 Claims, 5 Drawing Sheets

(51) Int. Cl.
*G01S 13/86* (2006.01)
*G01S 13/87* (2006.01)
*G01S 13/93* (2006.01)
*G01S 7/02* (2006.01)
*B60R 11/00* (2006.01)
*B60R 11/02* (2006.01)

(52) U.S. Cl.
CPC .............. *G01S 13/87* (2013.01); *G01S 13/93* (2013.01); *G01S 13/931* (2013.01); *B60R 2011/004* (2013.01); *B60R 2011/0026* (2013.01); *B60R 2011/0294* (2013.01); *B60R 2300/102* (2013.01); *G01S 2007/027* (2013.01)

(58) Field of Classification Search
USPC ....................................................... 296/1.08
See application file for complete search history.

(56) References Cited

U.S. PATENT DOCUMENTS

| | | |
|---|---|---|
| 2013/0127190 A1 | 5/2013 | Shamoto |
| 2014/0204599 A1 | 7/2014 | Miura et al. |
| 2017/0371036 A1* | 12/2017 | Griffin .................... G01S 13/93 |
| 2018/0045826 A1* | 2/2018 | Kasaba ................... G01S 17/42 |
| 2019/0003895 A1* | 1/2019 | Krishnan .............. G01S 13/931 |
| 2019/0202355 A1* | 7/2019 | Tatara ................ G06K 9/00791 |
| 2019/0210436 A1* | 7/2019 | Frederick ................ B60J 7/043 |

FOREIGN PATENT DOCUMENTS

| | | |
|---|---|---|
| JP | 2010-260493 A1 | 11/2010 |
| WO | WO-2019059026 A1 * | 3/2019 |

* cited by examiner

AUTOMATED VEHICLE PROTECTED AND AERODYNAMICALLY LOCATED SENSORS

CROSS-REFERENCE TO RELATED APPLICATION

This application claims the benefit under 35 U.S.C. § 371 of published PCT Patent Application Number PCT/US2016/14797, filed 26 Jan. 2016 and published as WO2016/126452 on 11 Aug. 2016, which claims the benefit under 35 U.S.C. § 119(e) of U.S. Provisional Patent Application No. 62/112,783, filed Feb. 6, 2015, the entire disclosure of which is hereby incorporated herein by reference.

TECHNICAL FIELD OF INVENTION

This invention relates to sensor systems on vehicle of the type suitable for autonomously driven vehicles.

BACKGROUND OF INVENTION

Autonomously driven vehicles, and other vehicles using sensors as part of a safety system, utilize radar, LIDAR, sonar, and other sensors mounted around the perimeter of the vehicle to sense the vehicle surroundings. Increasingly, it is desirable that the surroundings be sensed all around the perimeter of the vehicle 10, a full 360 degrees. Typically, a sensor 12 will have a predetermined spread or "cone" of sensing within which it optimally works, as seen in FIG. 1, and labeled O.C. O.C is centered about the lateral or X axis of the vehicle 10, normal to the length or Y axis. It's desirable as well to have the flexibility to place such sensors so as to get full perimeter sensing, perhaps with some overlap, but certainly with no significant gap. As seen in FIG. 1, this is relatively simple when the sides of the vehicle 10 to which the side sensors 12 are mounted form substantially right angles with the front.

With a flat fronted vehicle, the sensors 12 on the front side can be easily mounted near the front corner of the vehicle 10, potentially inside the outer skin of the vehicle 10, protected and facing in the optimal sensing direction, with the sensing cone OC essentially centered on the X or lateral axis of the vehicle 10. The central sensors 14 on the can be easily mounted centered near the front of the vehicle 10, potentially inside the outer skin of the vehicle 10, protected and facing in the optimal sensing direction, with the sensing cone OC centered on the longitudinal axis Y.

As seen in FIG. 2, the situation is not as optimal with a vehicle 10' in which the perimeter surface 16 of the front end or grill is rounded, both for aesthetic and aerodynamic considerations, wrapping around to the sides of the vehicle 10'. This is far more typical for non-commercial passenger vehicles. Then, in order to place the front side mounted sensors 12 in an equivalent position, they must be placed on an exterior bracket 18, exposed and non-aerodynamic. This places the optimal cone OC of the sensor 12 in substantially the identical position to FIG. 1, but with the obvious drawbacks noted. If, instead, as shown in FIG. 3, the front side sensors 12 are placed interior to the rounded front perimeter surface 16, while the sensor 12 is protected and aerodynamic, its sensing cone, indicated at SC to distinguish, diverges substantially from the optimal sensing cone OC by a differential angle alpha.

SUMMARY OF THE INVENTION

The subject invention provides a mounting for the front side sensors which gives environmental and structural protection, with minimal disturbance to the aerodynamic profile of the vehicle, as well as a closer to optimal sensing location.

In the preferred embodiment disclosed, a front side mounted sensor is fixed to the vehicle body in an orientation that is tipped away from its optimal orientation in terms of sensing, but also tipped away from a position where it can be entirely enclosed inside the perimeter surface of the curved front side of the vehicle. Instead, it is oriented with a leading corner edge outset from, and a trailing corner edge inset from, that perimeter surface. This orients the sensor closer to, but not right at, the optimal orientation that it could have if the perimeter surface of the vehicle were squared off, rather than curved.

Once fixed, the sensor is covered by a combination of lens and trim piece that together smooth the transition between the perimeter surface and the sensor location, thereby largely preserving the aerodynamics, while covering and protecting the sensor.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 4:
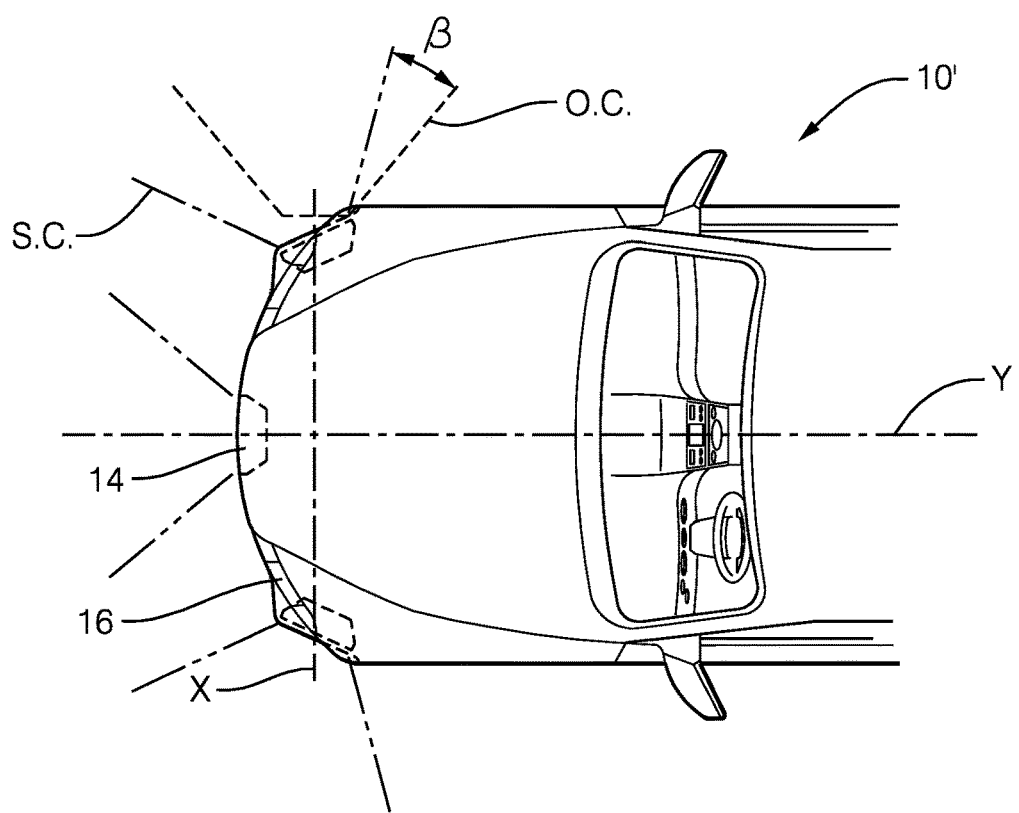
FIG. 4 shows a plan view of a preferred embodiment of the sensor placement of the invention.

Referring first to FIG. 4, the mounting of front side sensor 12, described in more detail below, puts the sensing cone SC nearer to the optimal cone location OC, differing therefrom by a smaller differential angle Beta. This is done in such a way as to give sensor 12 complete environmental protection, while substantially preserving the aerodynamic profile.

Figure 8:
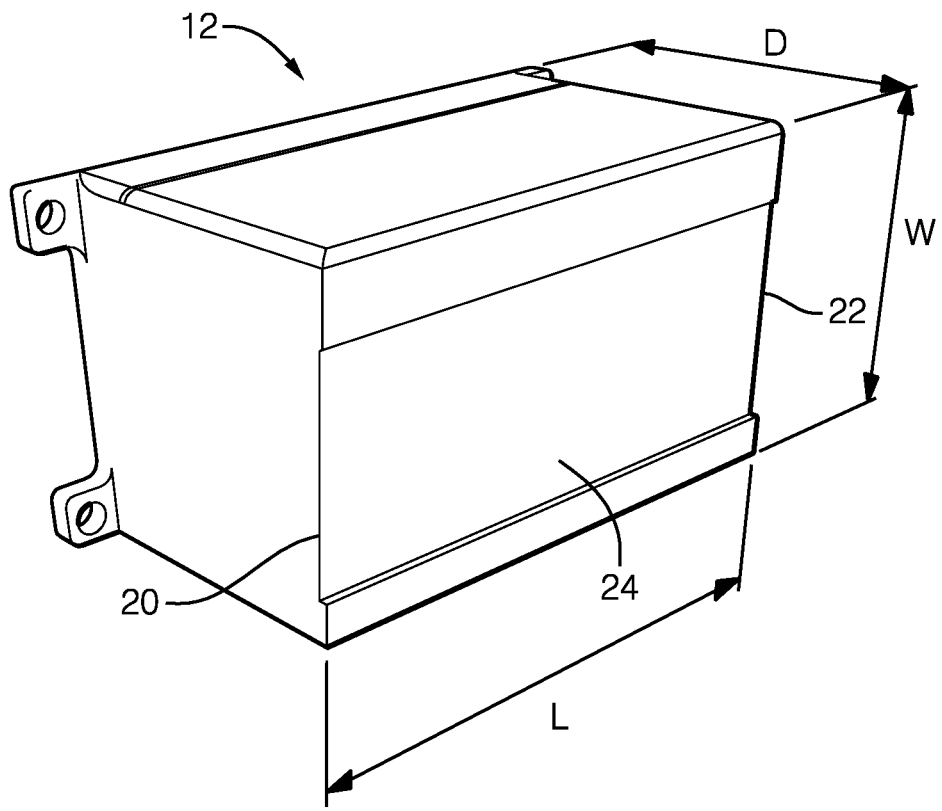
FIG. 8 is a view of a typical LIDAR sensor.

Referring next to FIG. 8, details of a typical LIDAR sensor 12 are disclosed. While the invention is not limited to such a sensor, it is a typical one in the location indicated for autonomous vehicles. LIDAR is not an acronym, as is commonly believed, but is shorthand for Light Detection and Ranging, an amalgam of Light and Radar. In effect, it is a ranging radar that uses laser light instead of radio waves. LIDAR uses ultraviolet, visible or near infrared light to image objects, and is capable of doing so with a very high level of resolution. Two types of pulse models are available, micropulse, and high energy, with the lower energy, "eye safe" systems being preferable for mobile sensing applications, as here. The particular LIDAR device 12 or 14 used here, though the invention is not limited to such, is an ibeo LUX 2010 Laserscanner, referred to hereafter simply as LIDAR 12 for convenience. It is of the general type described above, with a sensing cone SC as described above of approximately 100 degrees symmetrically arrayed about its center. It is roughly a rectangular prism, with a length L of approximately 150 mm, a width W of approximately 90 millimeters (at the front) and a depth D of approximately 90 mm. The rectangular prism within which the sensor 12 is contained has a leading or front corner edge 20 and a trailing or rear corner edge 22, both of which are contiguous to the front face 24 of sensor 12, but are designated front and rear in terms of the location relative to the front and rear of the vehicle 10'. As the driver side front sensor 12 is shown, the front and rear edge designation would be reversed if the sensor were to be mounted on the passenger side. The essential point is that the front face 24 of the sensor 12 is bounded by two edges 22 and 24, which are oriented as described next to achieve the desired result.

Figure 1:
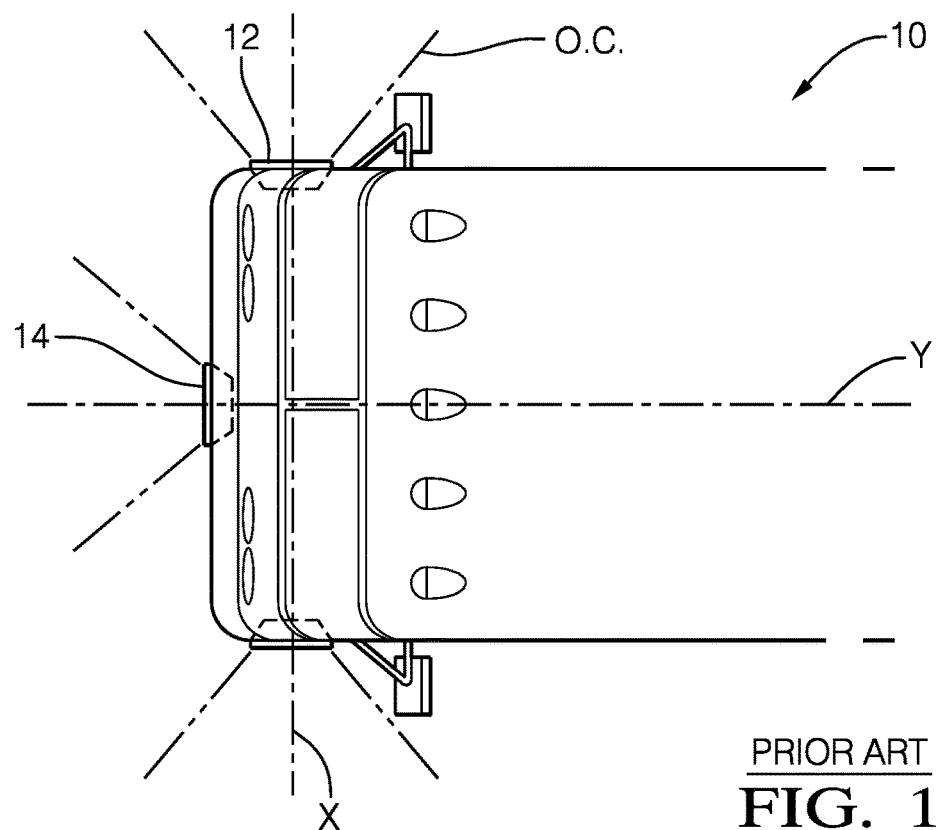
FIG. 1 is a plan view of the front of a prior art sensor placement as described above.
Figure 2:
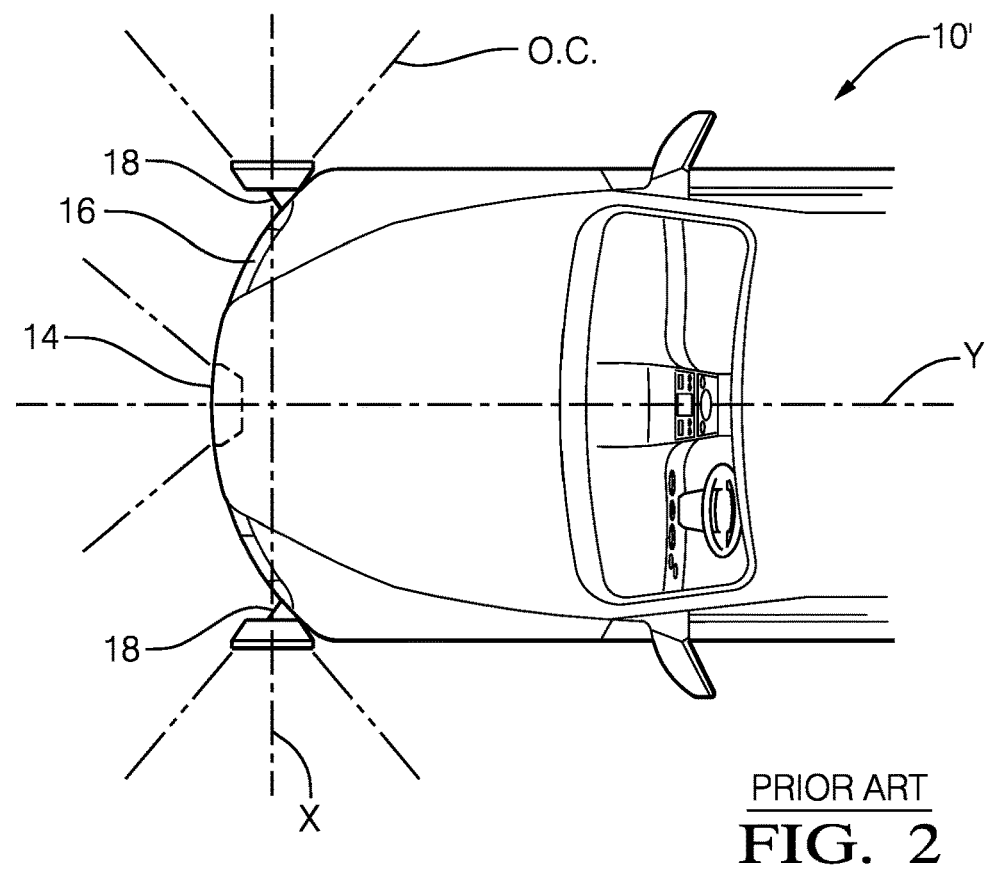
FIG. 2 is a plan view of another example of a prior art sensor placement.
Figure 3:
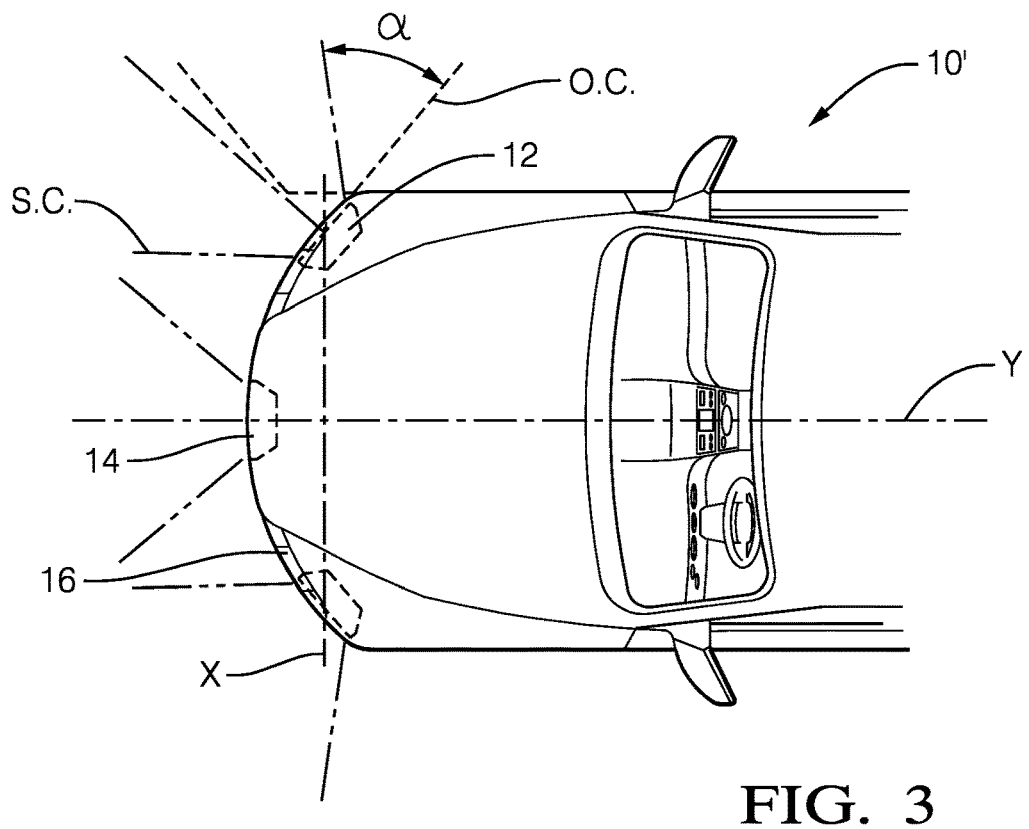
FIG. 3 shows an obvious variant of FIG. 1.
Figure 5:
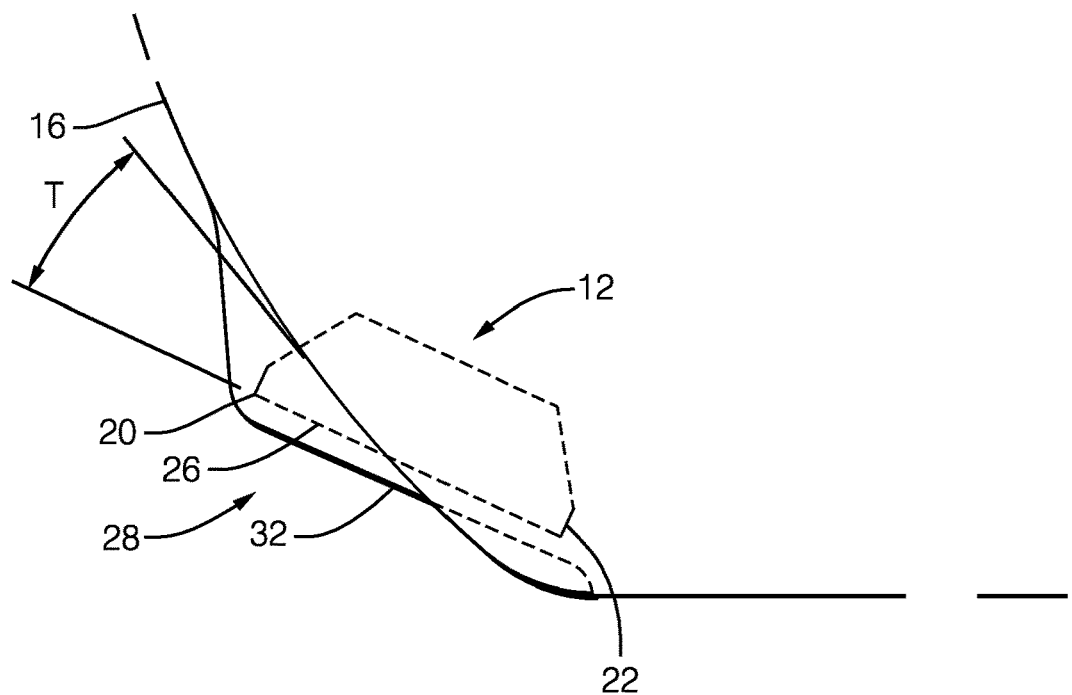
FIG. 5 is a schematic showing the orientation of a sensor.

Referring next to FIG. 5, sensor 12 is mounted to the vehicle, and relative to the line 16 that defines the front surface 16 of vehicle 10', in an orientation that tips the leading corner edge 20 outside of, and the trailing corner concurrently inside of, the front surface 16, so as to bring the front face 26 of the sensor closer toward a position parallel to the length axis of the vehicle, that is, closer than it would be if both corner edges 22 and 24 were inboard of the front surface 16. Again, by comparison, both corners are in that inboard location as shown in FIG. 3. Considering the line that defines the front surface 16 to be essentially straight at the point where the plane of sensor front surface 26 crosses it in FIG. 5, the angle of tip T is approximately 45 degrees, though it could be more or less, likely anywhere in a range of 70 to 10 degrees, or any subrange thereof. The point is, that by tipping the leading or front corner edge outboard of, and the rear of trailing corner edge inboard of the front perimeter surface of the vehicle, the sensor is placed in the orientation of FIG. 4, which is closer to the ideal orientation of FIG. 2 than it would be if it were mounted entirely inboard of perimeter surface 16, as shown in FIG. 3.

Figure 6:
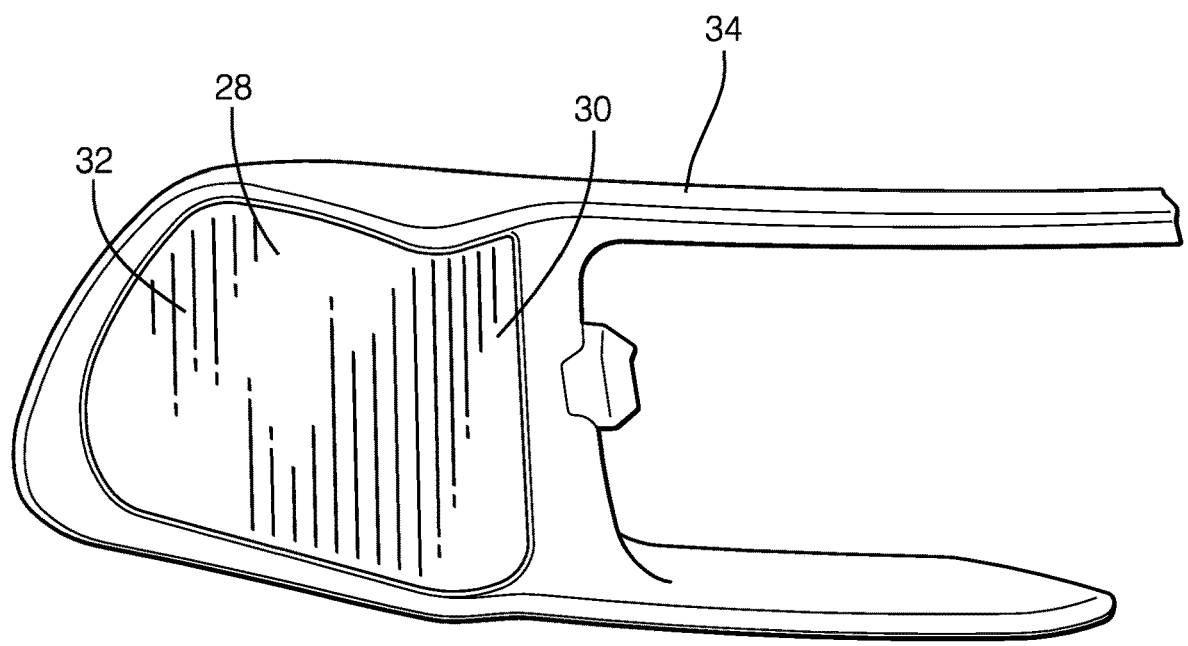
FIG. 6 is a view of the lens cover and trim piece used to cover the sensor
Figure 7:
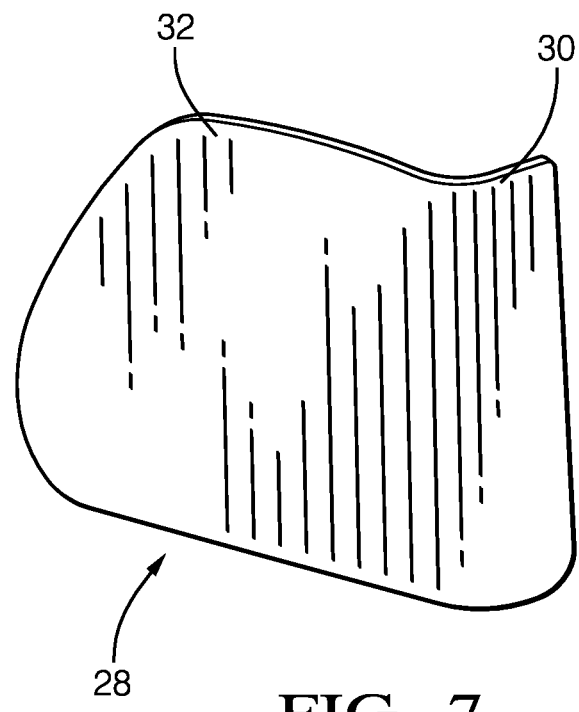
FIG. 7 is a view of just the lens.

Referring next to FIGS. 5, 6 and 7, the protection of sensor 12 from the ambient is provided by a translucent or transparent polycarbonate or acrylic glass cover, indicated generally at 28, which is generally L shaped, with a shorter leading leg 30 and longer trailing leg 32. Being transparent or translucent, cover 28 can be tinted to match or blend with a desired vehicle body color, such as light gray, so long as it is operationally transparent to infrared light. In the case of some other sensor, the cover would be of a material "transparent" to whatever signal it emitted and or received, such as radio waves. Cover 28 is mounted within a perimeter trim piece 34 that is fitted to the front of vehicle 10' so as to orient the cover 28 over sensor 12, with the longer, trailing leg 32 generally parallel to sensor front surface 26, and with shorter, leading leg 30 located over the sensor front or leading corner edge 20.

Figure 9:
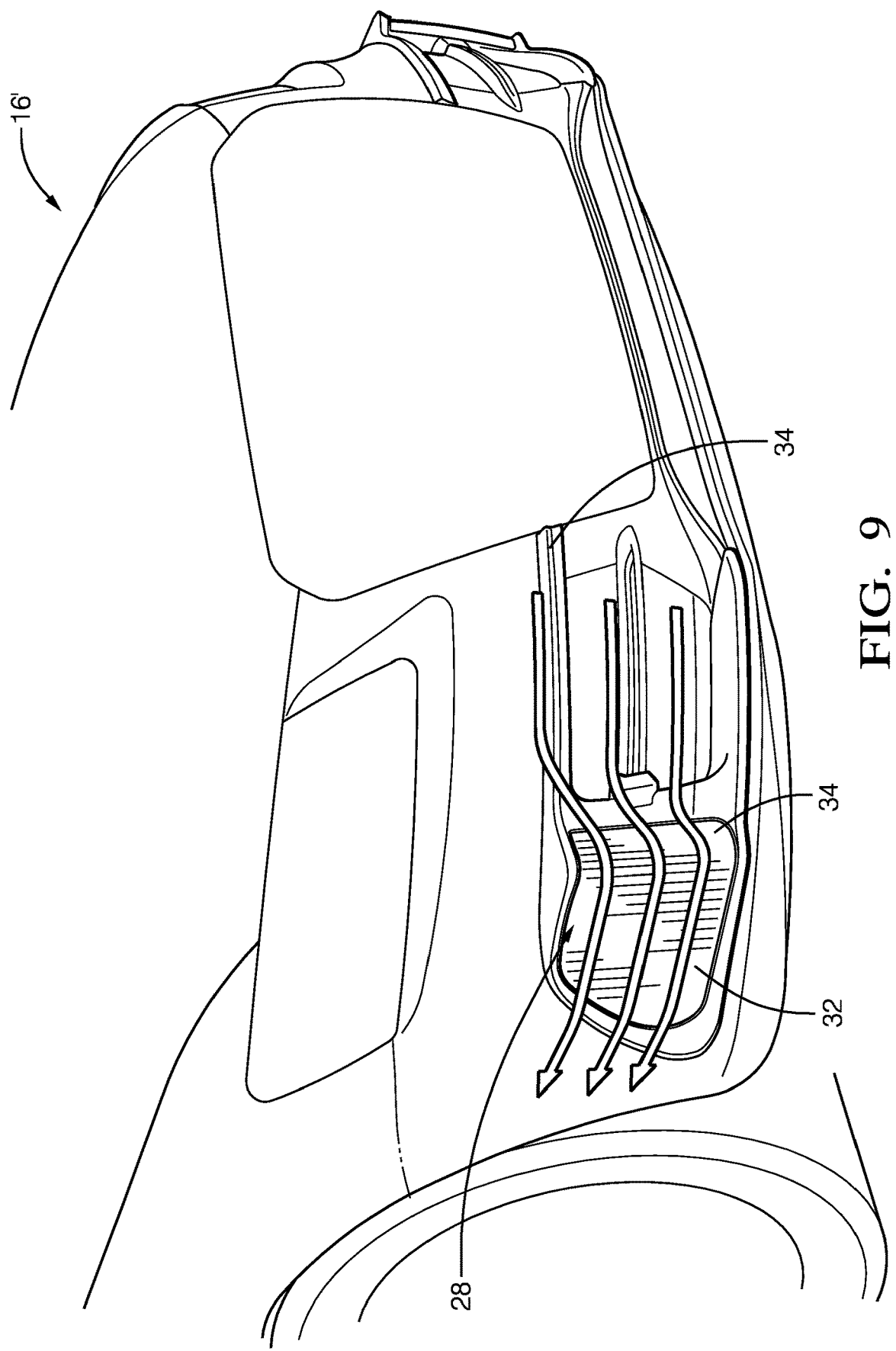
FIG. 9 is an enlarged perspective view of the front of the vehicle.

Referring next to FIG. 9, it can be seen that the surfaces of both legs 30 and 32 intersect and generally blend into the vehicle front surface 16, thereby creating an aerodynamic profile that does not depart very far from the original surface 16. The seal between the cover 28 and trim piece 34, and in turn between the supporting the trim piece 34 and the vehicle body, is weather tight and protective. The cover 28 presents a relatively smooth and aerodynamic profile. Specifically, the short, leading leg 30 presents a convex, wind cutting profile while the longer leg 32 presents a longer and less abrupt trailing profile that steadies the air currents and does not become concave relative to the front surface 16 until relatively close to its own trailing edge. That trailing edge concavity can, depending of the angle of tip, be minimized.

While this invention has been described in terms of the preferred embodiments thereof, it is not intended to be so limited, but rather only to the extent set forth in the claims that follow.

We claim:

1. In a vehicle having a generally curved front perimeter body surface that is generally symmetrically defined about a longitudinal body axis, and a side mounted sensor having a generally planar, outwardly facing front surface defined between leading and trailing corner edges, a sensor mounting arrangement comprising, said leading sensor edge being mounted to said vehicle with said leading corner edge outboard of, and said trailing corner edge inboard of, said perimeter surface, and a substantially transparent cover mounted to said vehicle so as to cover said sensor in a weather tight fashion and so as to blend aerodynamically into said front perimeter surface.

2. A mounting arrangement according to claim 1, in which said sensor is a lidar unit and said cover is transparent to light.

3. A mounting arrangement according to claim 1, in which said sensor cover has a relatively short leg covering said sensor leading corner edge and a relatively longer leg covering said sensor front surface.

4. A mounting arrangement according to claim 1 in which said cover is in turn mounted in a trim piece fixed to said vehicle.

* * * * *